(12) United States Patent
Zaghetto et al.

(10) Patent No.: US 12,361,597 B2
(45) Date of Patent: Jul. 15, 2025

(54) TASK-ORIENTED DYNAMIC MESH COMPRESSION USING OCCUPANCY NETWORKS

(71) Applicants: SONY GROUP CORPORATION, Tokyo (JP); Sony Corporation of America, New York, NY (US)

(72) Inventors: Alexandre Zaghetto, San Jose, CA (US); Danillo Graziosi, Flagstaff, AZ (US); Ali Tabatabai, Cupertino, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 208 days.

(21) Appl. No.: 17/861,033

(22) Filed: Jul. 8, 2022

(65) Prior Publication Data

US 2023/0016302 A1    Jan. 19, 2023

Related U.S. Application Data

(60) Provisional application No. 63/221,548, filed on Jul. 14, 2021.

(51) Int. Cl.
*G06T 9/00*     (2006.01)
(52) U.S. Cl.
CPC ............ *G06T 9/001* (2013.01); *G06T 9/002* (2013.01)
(58) Field of Classification Search
None
See application file for complete search history.

(56) References Cited

U.S. PATENT DOCUMENTS

| 10,192,353 | B1 | 1/2019 | Chou | |
|---|---|---|---|---|
| 2019/0236809 | A1* | 8/2019 | Graziosi | G06T 7/10 |
| 2021/0217203 | A1* | 7/2021 | Kim | G06T 9/001 |

(Continued)

FOREIGN PATENT DOCUMENTS

WO    2020012187 A1    1/2020

OTHER PUBLICATIONS

Jianqiang Wang, et al., Learned Point Cloud Geometry Compression, arXiv: 1909.12037v1 [cs.CV] Sep. 26, 2019, pp. 1-13, Nanjing University.

(Continued)

*Primary Examiner* — James A Thompson
(74) *Attorney, Agent, or Firm* — Haverstock & Owens, A Law Corporation (57) ABSTRACT

Methods, systems and device for efficiently compressing task-oriented dynamic meshes using occupancy networks are described herein. A single trained occupancy network model is able to reconstruct a mesh video using a few additional points per input mesh frame. To optimize the compression of the model and points, the estimated rate to compress the occupancy network is able to be included in the loss function. This minimizes the number of bits to encode the model, while it tries to reproduce the meshes as well as possible. An adaptive subsampling per input mesh is added to optimize the mesh reconstruction and the N-point point clouds compression. To optimize the model to perform a particular task, a metric is added to the cost function that takes this task into account.

21 Claims, 5 Drawing Sheets

(56) References Cited

U.S. PATENT DOCUMENTS

2021/0276591 A1* 9/2021 Urtasun ................. G08G 1/163
2023/0068178 A1* 3/2023 Schwarz .............. H04N 13/388

OTHER PUBLICATIONS

Tang Jiapeng et al: "Learning Parallel Dense Correspondence from Spatio-Temporal Descriptors for Efficient and Robust 4D Reconstruction", 2021 IEEE/CVF Conference on Computer Vision and Pattern Recognition (CVPR), IEEE, Jun. 20, 2021 (Jun. 20, 2021), pp. 6018-6027, XP034010692, DIO: 10.1109/CVPR46437.2021.00596 [retrieved on Oct. 15, 2021] the whole document.

Guarda Andre F R et al.: "Adaptive Deep Learning-Based Point Cloud Geometry Coding", IEEE Journal of Selected Topics in Signal Processing, IEEE, US, vol. 15, No. 2, Dec. 25, 2020 (Dec. 25, 2020), pp. 415-430, XP011840056, ISN: 1932-4553, DIO: 10.1109/JSTSP. 2020. 3047520 [retrieved on Feb. 19, 2021] abstract sections I, II and IV.

Ma Siwei et al: "Image and Video Compression with Neural Networks: A Review", IEEE Transaction on Circuits and Systems for Video Technology, vol. 30, No. 6, Apr. 1, 2019 (Apr. 1, 2019), pp. 1683-1698, XP055936502, USA ISSN: 1051-8215, DOI: 10.1109/TCSVT.2019.2910119 abstract sections III.C and VI.

Mescheder Lars et al: "Occupancy Networks: Learning 3D Reconstruction in Function Space", 2019 IEEE/CVF Conference on Computer Vision and Pattern Recognition (CVPR), IEEE, Jun. 15, 2019 (Jun. 15, 2019), pp. 4455-4465, XP033686741, DOI: 10.1109/CVPR, 2019.00459 [retrieved on Jan. 8, 2020] abstract sections 2-4.

Jia Wei et al: "Convolutional Neural Network-Based Occupancy Map Accuracy Improvement for Video-Based Point Cloud Compression", IEEE Transactions on Multimedia, IEEE, USA, vol. 24, May 12, 2021 (May 12, 2021), pp. 2352-2365, XP011907997, ISSN: 1520-9210, DOI: 10.1109/TMM.2021.3079698 [retrived on May 12, 2021] abstract sections I, II, IV and VI.

Panos Achlioptas et al: "Learning Representations and Generative Models for 3D Point Clouds", arxiv.org, Cornell University Library, 201 Olin Library Cornell University Ithaca, NY 14853, [Online] Jul. 8, 2017 (Jul. 8, 2017), xp081324797, the whole document.

International Search Report and Written Opinion from International Application No. PCT/IB2022/056479 dated Oct. 13, 2022.

* cited by examiner

TASK-ORIENTED DYNAMIC MESH COMPRESSION USING OCCUPANCY NETWORKS

CROSS-REFERENCE TO RELATED APPLICATION(S)

This application claims priority under 35 U.S.C. § 119(e) of the U.S. Provisional Patent Application Ser. No. 63/221,548, filed Jul. 14, 2021 and titled, "TASK-ORIENTED DYNAMIC MESH COMPRESSION USING OCCUPANCY NETWORKS," which is hereby incorporated by reference in its entirety for all purposes.

FIELD OF THE INVENTION

The present invention relates to three dimensional graphics. More specifically, the present invention relates to coding of three dimensional graphics.

BACKGROUND OF THE INVENTION

For a viable transmission of dynamic meshes, the large amount of data it represents is typically compressed.

Occupancy networks implicitly represent a 3D surface as continuous decision boundary of a deep neural network classifier. The implicit representation of a 3D surface enables a series of applications. However, the technique presents some limitations. First, the quality of the reconstructed 3D objects highly depends on the training set. Second, fine details may not be preserved. Third, compressing the model (implicit representation) may be very costly in terms of bit rate. In addition, most applications are limited to static input and output signals.

SUMMARY OF THE INVENTION

Methods, systems and device for efficiently compressing task-oriented dynamic meshes using occupancy networks are described herein. A single trained occupancy network model is able to reconstruct a mesh video using a few additional points per input mesh frame. To optimize the compression of the model and points, the estimated rate to compress the occupancy network is able to be included in the loss function. This minimizes the number of bits to encode the model, while it tries to reproduce the meshes as well as possible. An adaptive subsampling per input mesh is added to optimize the mesh reconstruction and the N-point point clouds compression. In some embodiments, N is 2048. To optimize the model to perform a particular task, a metric is added to the cost function that takes this task into account.

In one aspect, a method programmed in a non-transitory memory of a device comprises sampling a first set of meshes into a first set of point clouds, training a single occupancy network with the first set of meshes and the first set of point clouds, sampling a second set of meshes into a second set of point clouds, encoding and transmitting the trained occupancy network to a decoder and encoding and transmitting the second set of point clouds to the decoder. The method further comprises acquiring the first set of meshes and the second set of meshes. The first set of meshes and the second set of meshes are acquired using a camera system or via download. Sampling the first set of meshes and the second set of meshes includes retaining random aspects of each mesh of the first set of meshes and the second set of meshes. The first set of meshes and the second set of meshes comprise a video. The occupancy network is tuned to a specific task. A metric is used to optimize compression of the occupancy network, and an estimated rate to compress the occupancy network is included in a loss function.

In another aspect, an apparatus comprises a non-transitory memory for storing an application, the application for: sampling a first set of meshes into a first set of point clouds, training a single occupancy network with the first set of meshes and the first set of point clouds, sampling a second set of meshes into a second set of point clouds, encoding and transmitting the trained occupancy network to a decoder and encoding and transmitting the second set of point clouds to the decoder and a processor coupled to the memory, the processor configured for processing the application. The application is further configured for acquiring the first set of meshes and the second set of meshes. The first set of meshes and the second set of meshes are acquired using a camera system or via download. Sampling the first set of meshes and the second set of meshes includes retaining random aspects of each mesh of first set of meshes and the second set of meshes. The first set of meshes and the second set of meshes comprise a video. The occupancy network is tuned to a specific task. A metric is used to optimize compression of the occupancy network, and an estimated rate to compress the occupancy network is included in a loss function.

In another aspect, a system comprises an encoder configured for: sampling a first set of meshes into a first set of point clouds, training a single occupancy network with the first set of meshes and the first set of point clouds, sampling a second set of meshes into a second set of point clouds, encoding and transmitting the trained occupancy network and encoding and transmitting the second set of point clouds and a decoder configured for: receiving the trained occupancy network and the second set of point clouds, decoding the occupancy network and the second set of point clouds and reconstructing the second set of meshes from the second set of point clouds using the occupancy network. The encoder is further configured for acquiring the first set of meshes and the second set of meshes. The first set of meshes and the second set of meshes are acquired using a camera system or via download. Sampling the first set of meshes and the second set of meshes includes retaining random aspects of each mesh of the first set of meshes and the second set of meshes. The first set of meshes and the second set of meshes comprise a video. The occupancy network is tuned to a specific task. A metric is used to optimize compression of the occupancy network, and an estimated rate to compress the occupancy network is included in a loss function.

DETAILED DESCRIPTION OF THE PREFERRED EMBODIMENT

Methods, systems and device for efficiently compressing task-oriented dynamic meshes using occupancy networks are described herein. Compressing the implicit representation for one single 3D frame may be costly but considering that in many cases a dynamic mesh is a sequence of different poses of the same object, each mesh frame is able to be seen as a sample of a single class that is able to be embedded into the network. One single trained occupancy network model is able to reconstruct a mesh video using a few additional points per input mesh frame. To optimize the compression of the model and points, the estimated rate to compress the occupancy network is able to be included in the loss function. This minimizes the number of bits to encode the model, while it tries to reproduce the meshes as well as possible. An adaptive subsampling per input mesh is added to optimize the mesh reconstruction and the N-point point clouds compression. In some embodiments, N is 2048. It is also possible to merge multiple N-point point clouds into one single G-PCC frame and use the frame index attribute to recover the individual point clouds at the decoder side. Sampling strategy is able to consider the avoidance of duplicate points after merging. To optimize the model to perform a particular task, a metric is able to be added to the cost function that takes this task into account. The quality of the reconstructed meshes would be driven by the intended application.

Dynamic mesh compression is a common problem that is being addressed by many researchers and engineers, including the current MPEG V-MESH activity. However, the compression scheme based on occupancy networks described herein is able to provide a more flexible codec since the compression is also driven by the task being targeted.

Figure 1:
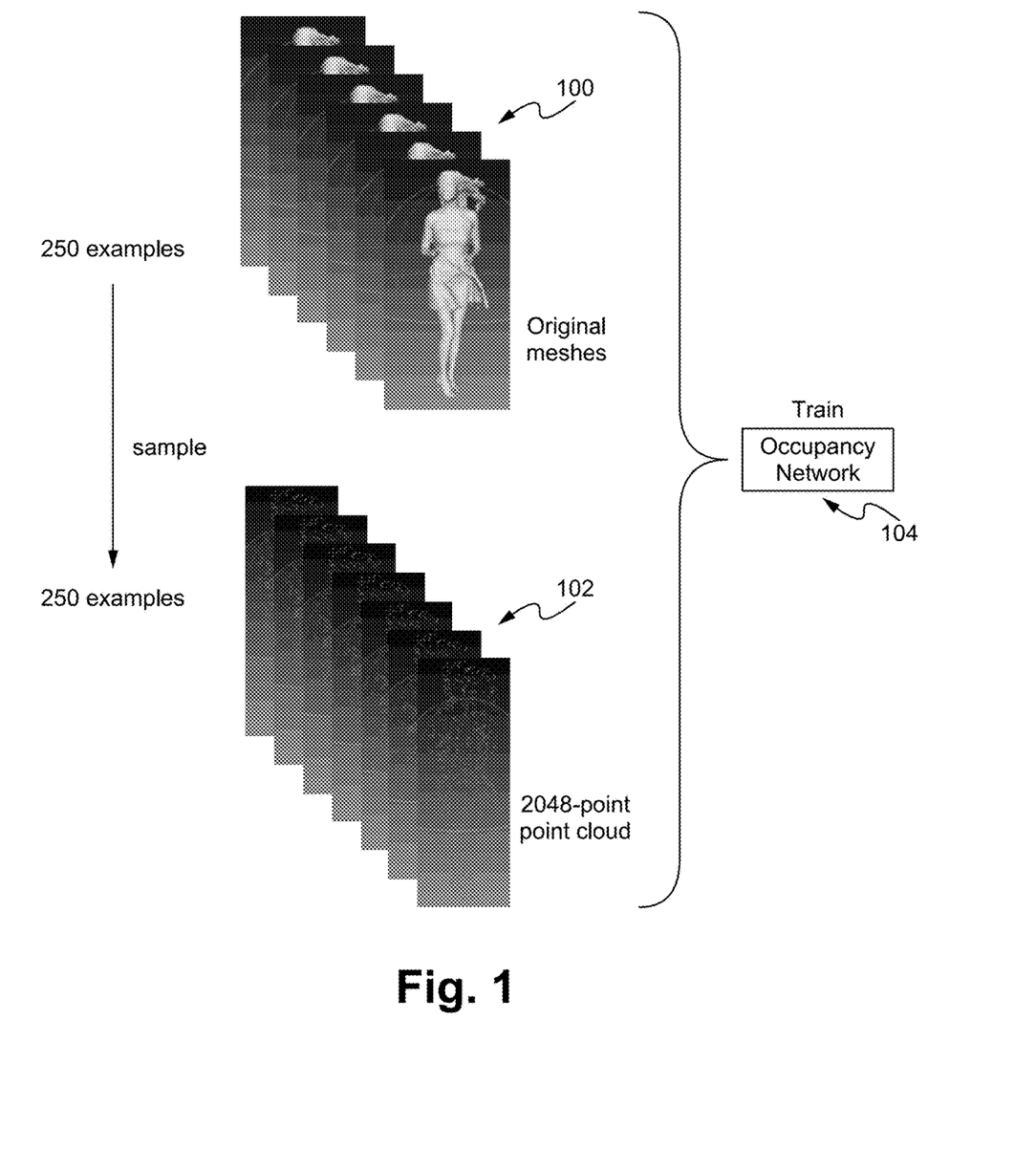
FIG. 1 illustrates a diagram of a training implementation for task-oriented dynamic mesh compression using occupancy networks according to some embodiments.

FIG. 1 illustrates a diagram of a training implementation for task-oriented dynamic mesh compression using occupancy networks according to some embodiments. There are 250 examples of original meshes 100 which are sampled into 250 examples of 2048-point (2 k point) point clouds 102. Both sets of examples are used to train an occupancy network 104. The occupancy network 104 is trained specifically for the received input for a specific class of objects. Since this is a video, although the mesh is a woman in a dress, the woman is moving into different poses, thus having a class of objects.

Figure 2:
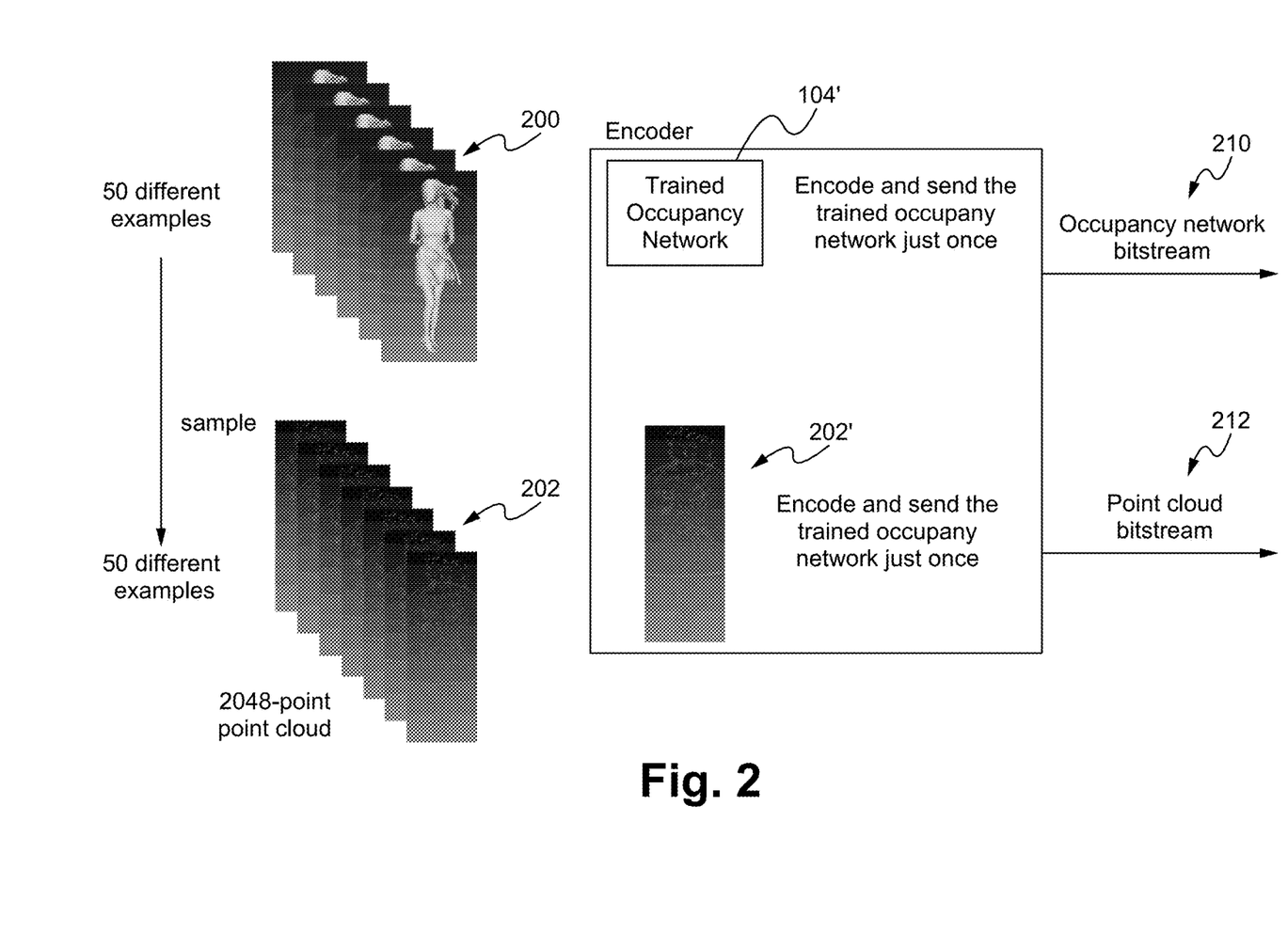
FIG. 2 illustrates a diagram of an encoding implementation for task-oriented dynamic mesh compression using occupancy networks according to some embodiments.

Once the occupancy network 104 is trained, then frames from the same class of objects are able to be encoded. FIG. 2 illustrates a diagram of an encoding implementation for task-oriented dynamic mesh compression using occupancy networks according to some embodiments. For a video with 300 meshes, 250 meshes (or another number) are able to be used for training, and then 50 meshes 200 (or frames) (or another number) are able to be compressed/encoded. The 50 examples are sampled to generate 50 2 k-point point clouds 202. Since the occupancy network is trained for the class/classes, the trained occupancy network 104' is able to be encoded and sent. In some embodiments, the trained occupancy network 104' is encoded and sent only one time. Each point cloud is encoded (e.g., using lossless geometry-based point cloud compression (G-PCC)) to generate encoded point clouds 202'. Thus, there is an occupancy network bitstream 210 and a point cloud bitstream 212 (e.g., two parallel bitstreams).

Figure 3:
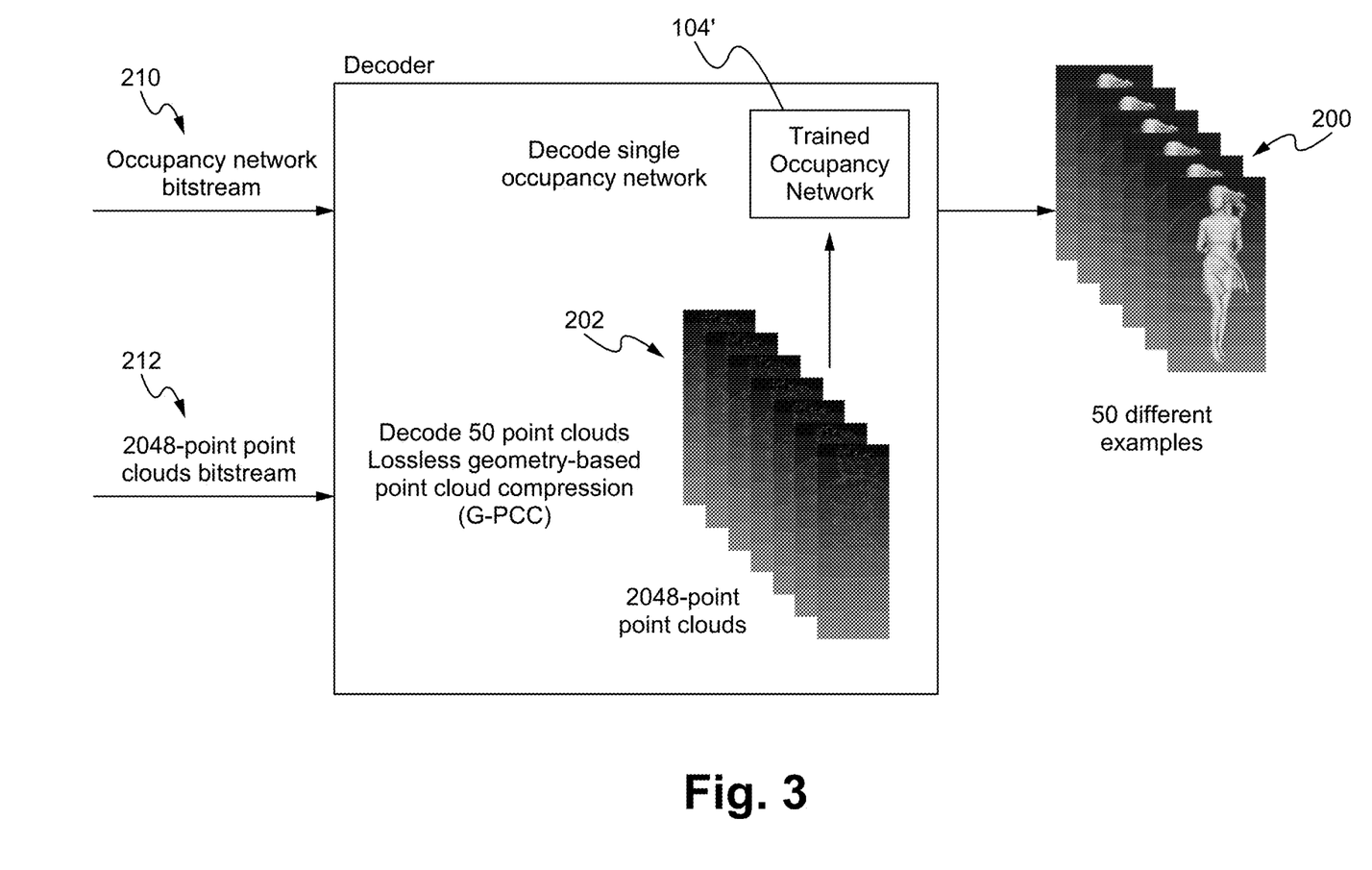
FIG. 3 illustrates a diagram of a decoding implementation for task-oriented dynamic mesh compression using occupancy networks according to some embodiments.

FIG. 3 illustrates a diagram of a decoding implementation for task-oriented dynamic mesh compression using occupancy networks according to some embodiments. The decoder receives the occupancy network bitstream 210 and the point cloud bitstream 212. The single trained occupancy network 104' is decoded. Also, the 50 point clouds 202 are decoded. The trained occupancy network is then used to generate/recover the 50 different examples (meshes/frames) 200 from the decoded point clouds 202.

The occupancy network is able to be optimized to perform a particular task such as discussed in U.S. patent Ser. No. 17/828,392, titled "TASK-DRIVEN MACHINE LEARNING-BASED REPRESENTATION AND COMPRESSION OF POINT CLOUD GEOMETRY," and filed May 31, 2022, which is incorporated by reference in its entirety for all purposes.

A metric is able to be optimized to make a network tuned to a specific task. Another metric is able to be used to optimize compression of the model in points, the estimated rate to compress the occupancy network in the loss function is able to be included. These metrics/parameters are able to be used in the training.

Figure 4:
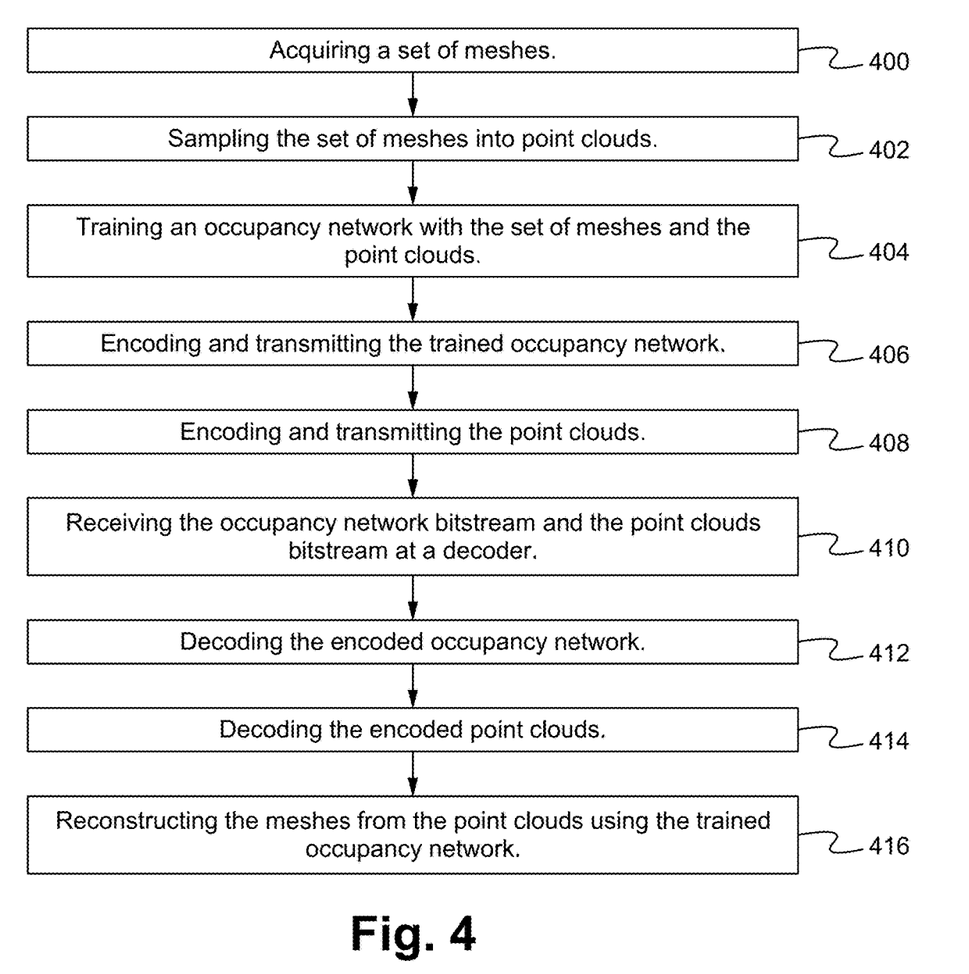
FIG. 4 illustrates a flowchart of a method of implementing task-oriented dynamic mesh compression using occupancy networks according to some embodiments.

FIG. 4 illustrates a flowchart of a method of implementing task-oriented dynamic mesh compression using occupancy networks according to some embodiments. In the step 400, a set of meshes is acquired/received (e.g., 250 examples). The set of meshes is able to be a video or part of a video. The set of meshes is able to be acquired in any manner such as using a camera or camera system or receiving the set such as via download. In the step 402, the set of meshes is sampled into a set of point clouds (e.g., 250 examples). Sampling is able to be performed in any manner to reduce the size of each of the meshes. For example, random or specific triangles of each mesh are retained while the other triangles are not, resulting in reduced size point clouds (e.g., 2048-point point clouds). In the step 404, the meshes and the point clouds are used to train an occupancy network. The training is performed in any machine learning manner. For example, an occupancy network is trained to learn a specific class of objects.

In the step 406, the trained occupancy network is encoded and transmitted (e.g., to a decoder) in an occupancy network bitstream. Any form of encoding is able to be implemented such as encoding a function of the trained occupancy network related to probability of occupancy of positions which is able to be used to reconstruct mesh data. In some embodiments, the trained occupancy network is encoded and sent one time (e.g., for each class of objects). In other words, a single trained occupancy network is transmitted. In the step 408, each point cloud is encoded and sent (e.g., to the decoder) in a point cloud bitstream. The point clouds are able to be encoded using lossless geometry-based point cloud compression (G-PCC). In some embodiments, the trained occupancy network and the point clouds are encoded and/or transmitted at the same time.

In the step 410, a decoder receives the occupancy network bitstream and the point clouds bitstream. In the step 412, the decoder decodes the occupancy network. The occupancy network is able to be decoded in any manner. In the step 414, the decoder decodes the point clouds. The point clouds are able to be decoded in any manner such as using G-PCC. In some embodiments, the occupancy network and the point clouds are decoded at the same time. In the step 416, the trained occupancy network reconstructs the meshes from the point clouds. As described in U.S. patent Ser. No. 17/828,326, titled "POINT CLOUD COMPRESSION USING OCCUPANCY NETWORKS," and filed May 31, 2022, which is incorporated by reference in its entirety for all purposes, the trained occupancy network is able to receive a sparse input, and generate/reconstruct an object from the sparse input. In some embodiments, the order of the steps is modified. In some embodiments, fewer or additional steps are implemented. For example, a metric is able to be optimized to make an occupancy network tuned to a specific task. Another metric is able to be used to optimize compression of the model in points—the estimated rate to compress the occupancy network is able to be included in the loss function. These metrics/parameters are able to be used in the training.

Figure 5:
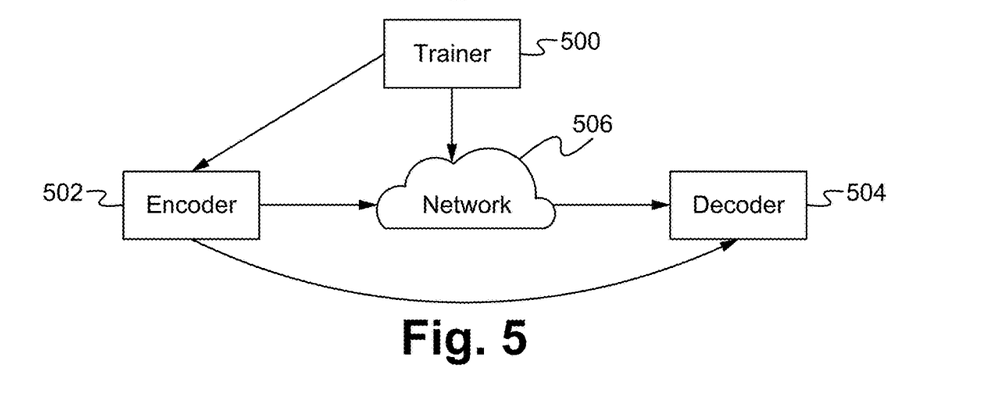
FIG. 5 illustrates a diagram of a network of devices configured to implement the method of implementing task-oriented dynamic mesh compression using occupancy networks according to some embodiments.

FIG. 5 illustrates a diagram of a network of devices configured to implement the method of implementing task-oriented dynamic mesh compression using occupancy networks according to some embodiments. A training device 500 is configured to implement the training aspects of the task-oriented dynamic mesh compression using occupancy networks implementation. An encoder 502 is configured to implement the encoding aspects of the task-oriented dynamic mesh compression using occupancy networks implementation. The encoder 500 communicates the encoded information to a decoder 504. The decoder 504 is configured to decode the encoded information. In some embodiments, the decoder 504 communicates the decoded information to a display component. The encoder 502 is able to communicate the encoded information to the decoder 504 over a network 506. The network 506 is able to be any network such as the Internet or a Local Area Network (LAN). In some embodiments, the training device 500, encoder 502 and decoder 504 are able to communicate directly (e.g., without a network). In some embodiments, the training device 500, encoder 502 and the decoder 504 are on/in the same device. In some embodiments, the encoder 502 performs the training and encoding.

Figure 6:
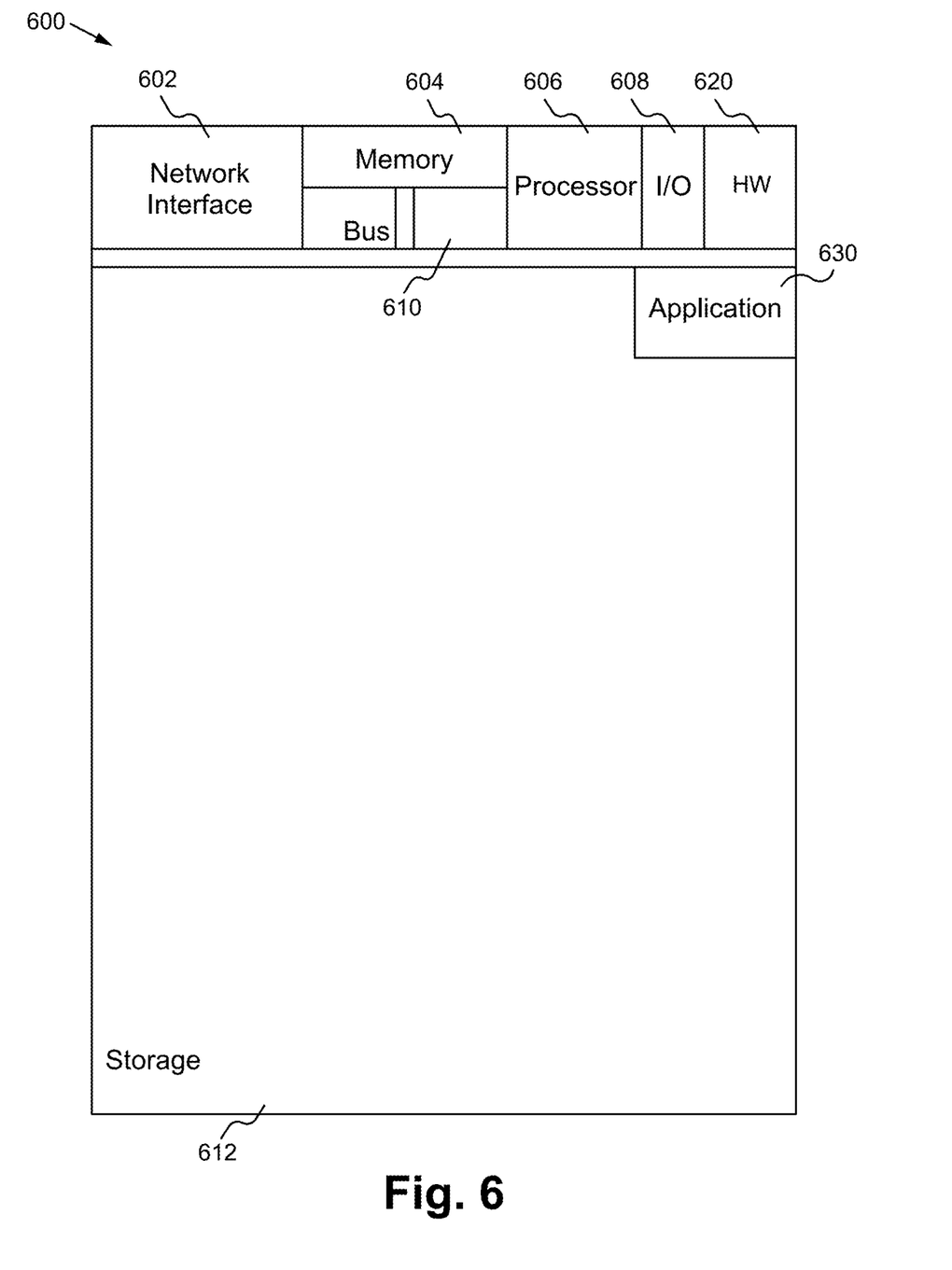
FIG. 6 illustrates a block diagram of an exemplary computing device configured to implement the method of implementing task-oriented dynamic mesh compression using occupancy networks according to some embodiments.

FIG. 6 illustrates a block diagram of an exemplary computing device configured to implement the method of implementing task-oriented dynamic mesh compression using occupancy networks according to some embodiments. The computing device 600 is able to be used to acquire, store, compute, process, communicate and/or display information such as images and videos including 3D content. The computing device 600 is able to implement any of the encoding/decoding aspects. In general, a hardware structure suitable for implementing the computing device 600 includes a network interface 602, a memory 604, a processor 606, I/O device(s) 608, a bus 610 and a storage device 612. The choice of processor is not critical as long as a suitable processor with sufficient speed is chosen. The memory 604 is able to be any conventional computer memory known in the art. The storage device 612 is able to include a hard drive, CDROM, CDRW, DVD, DVDRW, High Definition disc/drive, ultra-HD drive, flash memory card or any other storage device. The computing device 600 is able to include one or more network interfaces 602. An example of a network interface includes a network card connected to an Ethernet or other type of LAN. The I/O device(s) 608 are able to include one or more of the following: keyboard, mouse, monitor, screen, printer, modem, touchscreen, button interface and other devices. Compression application(s) 630 used to implement the compression implementation are likely to be stored in the storage device 612 and memory 604 and processed as applications are typically processed. More or fewer components shown in FIG. 6 are able to be included in the computing device 600. In some embodiments, compression hardware 620 is included. Although the computing device 600 in FIG. 6 includes applications 630 and hardware 620 for the compression method, the compression method is able to be implemented on a computing device in hardware, firmware, software or any combination thereof. For example, in some embodiments, the compression applications 630 are programmed in a memory and executed using a processor. In another example, in some embodiments, the compression hardware 620 is programmed hardware logic including gates specifically designed to implement the compression method.

In some embodiments, the compression application(s) 630 include several applications and/or modules. In some embodiments, modules include one or more sub-modules as well. In some embodiments, fewer or additional modules are able to be included.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, a smart phone, a portable music player, a tablet computer, a mobile device, a video player, a video disc writer/player (e.g., DVD writer/player, high definition disc writer/player, ultra high definition disc writer/player), a television, a home entertainment system, an augmented reality device, a virtual reality device, smart jewelry (e.g., smart watch), a vehicle (e.g., a self-driving vehicle) or any other suitable computing device.

To utilize the compression method, a device acquires or receives 3D content (e.g., point cloud content). The compression method is able to be implemented with user assistance or automatically without user involvement.

In operation, the compression method enables more efficient and more accurate 3D content encoding compared to previous implementations. The compression method is highly scalable as well.

Some Embodiments of Point Cloud Compression Using Occupancy Networks

1. A method programmed in a non-transitory memory of a device comprising:
    sampling a first set of meshes into a first set of point clouds;
    training a single occupancy network with the first set of meshes and the first set of point clouds;
    sampling a second set of meshes into a second set of point clouds;
    encoding and transmitting the trained occupancy network to a decoder; and
    encoding and transmitting the second set of point clouds to the decoder.
2. The method of clause 1 further comprising acquiring the first set of meshes and the second set of meshes.
3. The method of clause 2 wherein the first set of meshes and the second set of meshes are acquired using a camera system or via download.
4. The method of clause 1 wherein sampling the first set of meshes and the second set of meshes includes retaining random aspects of each mesh of the first set of meshes and the second set of meshes.
5. The method of clause 1 wherein the first set of meshes and the second set of meshes comprise a video.
6. The method of clause 1 wherein the occupancy network is tuned to a specific task.

7. The method of clause 1 wherein a metric is used to optimize compression of the occupancy network, and an estimated rate to compress the occupancy network is included in a loss function.
8. An apparatus comprising:
   a non-transitory memory for storing an application, the application for:
      sampling a first set of meshes into a first set of point clouds;
      training a single occupancy network with the first set of meshes and the first set of point clouds;
      sampling a second set of meshes into a second set of point clouds;
      encoding and transmitting the trained occupancy network to a decoder; and
      encoding and transmitting the second set of point clouds to the decoder; and
   a processor coupled to the memory, the processor configured for processing the application.
9. The apparatus of clause 8 wherein the application is further configured for acquiring the first set of meshes and the second set of meshes.
10. The apparatus of clause 9 wherein the first set of meshes and the second set of meshes are acquired using a camera system or via download.
11. The apparatus of clause 8 wherein sampling the first set of meshes and the second set of meshes includes retaining random aspects of each mesh of first set of meshes and the second set of meshes.
12. The apparatus of clause 8 wherein the first set of meshes and the second set of meshes comprise a video.
13. The apparatus of clause 8 wherein the occupancy network is tuned to a specific task.
14. The apparatus of clause 8 wherein a metric is used to optimize compression of the occupancy network, and an estimated rate to compress the occupancy network is included in a loss function.
15. A system comprising:
   an encoder configured for:
      sampling a first set of meshes into a first set of point clouds;
      training a single occupancy network with the first set of meshes and the first set of point clouds;
      sampling a second set of meshes into a second set of point clouds;
      encoding and transmitting the trained occupancy network; and
      encoding and transmitting the second set of point clouds; and
   a decoder configured for:
      receiving the trained occupancy network and the second set of point clouds;
      decoding the occupancy network and the second set of point clouds; and
      reconstructing the second set of meshes from the second set of point clouds using the occupancy network.
16. The system of clause 15 wherein the encoder is further configured for acquiring the first set of meshes and the second set of meshes.
17. The system of clause 16 wherein the first set of meshes and the second set of meshes are acquired using a camera system or via download.
18. The system of clause 15 wherein sampling the first set of meshes and the second set of meshes includes retaining random aspects of each mesh of the first set of meshes and the second set of meshes.
19. The system of clause 15 wherein the first set of meshes and the second set of meshes comprise a video.
20. The system of clause 15 wherein the occupancy network is tuned to a specific task.
21. The system of clause 15 wherein a metric is used to optimize compression of the occupancy network, and an estimated rate to compress the occupancy network is included in a loss function.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:
1. A method programmed in a non-transitory memory of a device comprising:
   sampling a first set of meshes into a first set of point clouds, wherein sampling the first set of meshes is approximately 83% of the meshes of a video;
   training a single occupancy network with the first set of meshes and the first set of point clouds, wherein the single occupancy network is trained specifically for a specific class of objects;
   sampling a second set of meshes into a second set of point clouds, wherein sampling the second set of meshes is approximately 17% of the meshes of the video;
   encoding and transmitting the trained occupancy network to a decoder, wherein the trained occupancy network is encoded and sent only once to the decoder;
   encoding and transmitting the second set of point clouds to the decoder, wherein the second set of point clouds include multiple N-point point clouds merged into a single frame, wherein the second set of point clouds are from the same specific class of objects; and
   optimizing mesh reconstruction via an adaptive subsampling per mesh.
2. The method of claim 1 further comprising acquiring the first set of meshes and the second set of meshes.
3. The method of claim 2 wherein the first set of meshes and the second set of meshes are acquired using a camera system or via download.
4. The method of claim 1 wherein sampling the first set of meshes and the second set of meshes includes retaining random aspects of each mesh of the first set of meshes and the second set of meshes.
5. The method of claim 1 wherein the first set of meshes and the second set of meshes comprise a video.
6. The method of claim 1 wherein the occupancy network is tuned to a specific task.
7. The method of claim 1 wherein a metric is used to optimize compression of the occupancy network, and an estimated rate to compress the occupancy network is included in a loss function.
8. An apparatus comprising:
   a non-transitory memory for storing an application, the application for:
      sampling a first set of meshes into a first set of point clouds;
      training a single occupancy network with the first set of meshes and the first set of point clouds, wherein the single occupancy network is trained specifically for a specific class of objects;

sampling a second set of meshes into a second set of point clouds;

encoding and transmitting the trained occupancy network to a decoder;

encoding and transmitting the second set of point clouds to the decoder, wherein the second set of point clouds are from the same specific class of objects; and optimizing mesh reconstruction via an adaptive subsampling per mesh; and a processor coupled to the memory, the processor configured for processing the application.

9. The apparatus of claim 8 wherein the application is further configured for acquiring the first set of meshes and the second set of meshes.

10. The apparatus of claim 9 wherein the first set of meshes and the second set of meshes are acquired using a camera system or via download.

11. The apparatus of claim 8 wherein sampling the first set of meshes and the second set of meshes includes retaining random aspects of each mesh of first set of meshes and the second set of meshes.

12. The apparatus of claim 8 wherein the first set of meshes and the second set of meshes comprise a video.

13. The apparatus of claim 8 wherein the occupancy network is tuned to a specific task.

14. The apparatus of claim 8 wherein a metric is used to optimize compression of the occupancy network, and an estimated rate to compress the occupancy network is included in a loss function.

15. A system comprising:
an encoder configured for:
sampling a first set of meshes into a first set of point clouds;

training a single occupancy network with the first set of meshes and the first set of point clouds;

sampling a second set of meshes into a second set of point clouds;

encoding and transmitting the trained occupancy network; and encoding and transmitting the second set of point clouds, wherein the second set of point clouds include multiple N-point point clouds merged into a single frame, wherein the second set of point clouds are from a same class of objects as the first set of point clouds; and a decoder configured for:
receiving the trained occupancy network and the second set of point clouds;

decoding the occupancy network and the second set of point clouds, including using a frame index attribute to recover individual point clouds from the single frame; and reconstructing the second set of meshes from the second set of point clouds using the occupancy network, wherein reconstructing is optimized via an adaptive subsampling per mesh.

16. The system of claim 15 wherein the encoder is further configured for acquiring the first set of meshes and the second set of meshes.

17. The system of claim 16 wherein the first set of meshes and the second set of meshes are acquired using a camera system or via download.

18. The system of claim 15 wherein sampling the first set of meshes and the second set of meshes includes retaining random aspects of each mesh of the first set of meshes and the second set of meshes.

19. The system of claim 15 wherein the first set of meshes and the second set of meshes comprise a video.

20. The system of claim 15 wherein the occupancy network is tuned to a specific task.

21. The system of claim 15 wherein a metric is used to optimize compression of the occupancy network, and an estimated rate to compress the occupancy network is included in a loss function.

* * * * *